(12) United States Patent
Weinzimmer et al.

(10) Patent No.: US 6,681,151 B1
(45) Date of Patent: Jan. 20, 2004

(54) SYSTEM AND METHOD FOR SERVOING ROBOTS BASED UPON WORKPIECES WITH FIDUCIAL MARKS USING MACHINE VISION

(75) Inventors: Russ Weinzimmer, Milford, NH (US); Aaron Wallack, Natick, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 111 days.

(21) Appl. No.: 09/738,542

(22) Filed: Dec. 15, 2000

(51) Int. Cl.$^7$ ........................... G05B 15/00; G05B 19/00
(52) U.S. Cl. ................... 700/259; 700/245; 700/254; 700/83; 700/85; 382/146; 717/104; 219/124.34; 219/121.85; 348/94; 348/95; 356/243.1; 356/237.1
(58) Field of Search ................ 700/254, 245, 700/259, 159, 83, 85; 382/146, 151, 154, 145, 103, 199, 291, 294, 295, 287, 152; 717/104, 109; 219/124.34, 121.85; 356/243.1, 237.6, 237.1; 348/94, 95

(56) References Cited

U.S. PATENT DOCUMENTS

| | | | | |
|---|---|---|---|---|
| 3,298,474 A | * | 1/1967 | Roselius et al. | 188/200 |
| 5,341,459 A | * | 8/1994 | Backes | 700/260 |
| 5,754,679 A | * | 5/1998 | Koljonen et al. | 382/151 |
| 5,757,956 A | * | 5/1998 | Koljonen et al. | 382/151 |
| 5,768,443 A | * | 6/1998 | Michael et al. | 382/294 |
| 5,825,483 A | * | 10/1998 | Michael et al. | 356/243.1 |
| 5,845,007 A | * | 12/1998 | Ohashi et al. | 382/199 |
| 5,960,125 A | * | 9/1999 | Michael et al. | 382/294 |
| 5,978,081 A | * | 11/1999 | Michael et al. | 356/243.1 |
| 5,978,521 A | * | 11/1999 | Wallack et al. | 382/294 |
| 6,137,893 A | | 10/2000 | Michael et al. | 382/103 |
| 6,173,070 B1 | | 1/2001 | Michael et al. | 382/145 |
| 6,292,584 B1 | * | 9/2001 | Dulaney et al. | 382/151 |
| 6,301,396 B1 | * | 10/2001 | Michael et al. | 382/294 |
| 6,535,793 B2 | * | 3/2003 | Allard | 700/259 |
| 6,539,107 B1 | * | 3/2003 | Michael et al. | 382/154 |
| 2002/0021831 A1 | * | 2/2002 | Dulaney et al. | 382/152 |

OTHER PUBLICATIONS

Langrock et al., Advanced telerobotic controller, 1994, IEEE, pp. II–157–II–162.*
Alshawish et al., 3D object recognition using coded light projection for robot assembly applications, 1995, IEEE, pp. 1240–1247.*

(List continued on next page.)

Primary Examiner—William A. Cuchlinski, Jr.
Assistant Examiner—McDieunel Marc
(74) Attorney, Agent, or Firm—William Loginov

(57) ABSTRACT

A system and method for servoing robot marks using fiducial marks and machine vision provides a machine vision system having a machine vision search tool that is adapted to register a pattern, namely a trained fiducial mark, that is transformed by at least two translational degrees and at least one mon-translational degree of freedom. The fiducial is provided to workpiece carried by an end effector of a robot operating within a work area. When the workpiece enters an area of interest within a field of view of a camera of the machine vision system, the fiducial is recognized by the tool based upon a previously trained and calibrated stored image within the tool. The location of the work-piece is derived by the machine vision system based upon the viewed location of the fiducial. The location of the found fiducial is compared with that of a desired location for the fiducial. The desired location can be based upon a standard or desired position of the workpiece. If a difference between location of the found fiducial and the desired location exists, the difference is calculated with respect to each of the translational axes and the rotation. The difference can then be further transformed into robot-based coordinates to the robot controller, and workpiece movement is adjusted based upon the difference. Fiducial location and adjustment continues until the workpiece is located the desired position with minimum error.

37 Claims, 8 Drawing Sheets

OTHER PUBLICATIONS

Marchand et al. From data–flow task to multitasking: Applying the synchronous approach to active vision in robotics, 1997, IEEE, pp. 200–216.*

HPFIT, High procision fitting, 1997, Internet, pp. 1–15.*

U.S. patent application Ser. No. 09/738,941, Wallack, filed Dec. 15, 2000.

U.S. patent application Ser. No. 09/738,564, Wallack, filed Dec. 15, 2000.

U.S. patent application Ser. No. 09/738,962, Wallack, filed Dec. 15, 2000.

U.S. patent application Ser. No. 09/738,563, Wallack, filed Dec. 15, 2000.

U.S. patent application Ser. No. 09/737,836, Wallack, filed Dec. 15, 2000.

"A Tutorial on Visual Servo Control" Seth Hutchinson, Greg Hager and Peter Corke, May 14, 1996; 42 pages.

* cited by examiner

SYSTEM AND METHOD FOR SERVOING ROBOTS BASED UPON WORKPIECES WITH FIDUCIAL MARKS USING MACHINE VISION

RELATED APPLICATION

This application is related to commonly owned U.S. patent application Ser. No. 09/738,941, filed on Dec. 15, 2000, filed on even date herewith, entitled SYSTEM AND METHOD FOR SERVOING ROBOTS USING FIDUCIAL MARKS AND MACHINE VISION by Aaron S. Wallack.

BACKGROUND OF THE INVENTION

1. Field of the Invention

This invention relates to machine vision systems and more particularly to uses for advanced machine vision search tools that register patterns transformed by at least two translational and at least one non-translational degree of freedom.

2. Background Information

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of the surface is marked as unacceptable/defective. Machine vision has also been employed in varying degrees to assist in manipulating manufacturing engines in the performance of specific tasks. In particular, a workpiece held in a robot manipulator (end effector) can be guided to a target using a machine vision feedback procedure known as visual "servoing." In general, a robot end effector, or associated workpiece held therein, is guided to a desired final target location, such as an attachment point for a component part, based upon relative movement of the end effector within the field of view of a machine vision system. The robot is programmed with a general set of movement instructions. The machine vision system verifies that the end effector is moving within a particular coordinate grid in the proper direction toward the final target location. Typically, the grid is based upon movement within a two-dimensional image plane viewed by the camera, and involves a predefined/preloaded outline for the end effector (i.e. the machine vision system looks for a specific shape and correlated that shape to a given position). The vision system then instructs the robot whether the prevailing movement is proper, and the robot is servoed thereby into a proper movement direction. A discussion of prior art visual servoing techniques and principles is provided generally in the paper *A Tutorial on Visual Servo Control* by Seth Hutchinson, Department of Electrical and Computer Engineering, The Beckman Institute for Advanced Science and Technology, University of Illinois at Urbana-Champaign; Greg Hager, Department of Computer Science, Yale University and Peter Corke, CSIRO Division of Manufacturing Technology, Kenmore Australia; published May 14, 1996.

This servoing approach is limited in that it typically only analyzes translational degrees of freedom (e.g. those in the image plane) generally perpendicular to the camera axis, and does not take into account any non-translational degrees of freedom such as the distance (z-axis direction—toward and away from the camera), which relates to relative scale of the image, and/or the relative rotation (angle θ) of the end effector within the field of view. This servoing approach is therefore limited where the end effector is not located at a predictable location, or where the positioning of the camera has changed.

The advent of increasingly faster and higher-performance computers, has enabled the development of machine vision systems that employ powerful search tools. Such search tools enable a previously trained/stored image pattern to be acquired and registered/identified regardless of its viewed position. In particular, existing commercially available search tools can register such patterns transformed by at least three degrees of freedom, including two translational degrees (x and y-axis image plane) and a non-translational degree (rotation and/or scale, for example). One particular implementation of an advanced search tool is the rotation/scale-invariant search (RSIS) tool. This tool registers an image transformed by at least four degrees of freedom including the two translational degrees (x and y-axis image plane) and at least two non-translational degrees (z-axis (scale) and rotation within the x-y plane about an axis perpendicular to the plane. Some tools also register more complex transformations such as aspect ratio (rotation out of the plane whereby size on one axis decreases while size in the transverse axis thereto remains the same). These search tools, therefore, enable a specific pattern within the field of view to be located within a camera field of view to be positively identified and located accurately within the vision system's internal reference system (an x, y, z, rotation coordinate system, for example). The RSIS and other advanced search tools particularly allow for the identification and acquisition of patterns having somewhat arbitrary rotation, scaling (e.g. distancing) and translation with respect to the reference system. In other words, the tool is sufficiently robust to recognize a desired pattern even if it is rotated and larger/smaller/skewed relative to a "model" or trained pattern within the vision system.

In general, advanced machine vision tools acquire an image of a pattern via a camera and analyze the outline or a particular part of the pattern, such as a predetermined fiducial mark. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image to stored points in the model image. A pattern is registered if the mapping falls within accepted tolerances and parameters. Using various decision algorithms, the tool decides whether the viewed pattern, in a particular rotation and distance (scale) corresponds to the desired search pattern. If so, the tool confirms that the viewed pattern is, in fact, the pattern for which the tool is searching and fixes its position and orientation.

Machine vision systems having a three-degree-of-freedom, or greater, capability (such as RSIS) are available from a number of commercial vendors including Hexavision® from Adept Technology, Inc. of San Jose, Calif., and the popular Patmax® system from Cognex Corporation of Natick, Mass. Advanced machine vision search tools such as Patmax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less-advanced machine vision approaches.

It is therefore an object of this invention to provide a system and method for servoing a robot that is more robust than prior techniques and capable of accurately positioning workpieces held by robots onto a target location regardless of orientation within the field of view. The system and method of this invention should operate with a variety of robot configurations and for a great variety of robot movement patterns in each of at least four degrees of freedom.

SUMMARY OF THE INVENTION

This invention overcomes the disadvantages of the prior art by providing a system and method for servoing a workpiece held in a robot end effector, operating within a work area, that uses an advanced machine vision search tool capable of registering an acquired pattern in an image transformed by at least three degrees of freedom including, generally, at least two translational degrees and at least one non-translational degree of freedom with respect to an image plane (e.g. x and y-axis plane) as viewed by the machine vision system. The machine vision search tool can be a rotation/scale-invariant search (RSIS) tool, or another equivalent implementation adapted to recognize and locate one or more previously trained and calibrated fiducial marks on the workpiece regardless of translation and rotation of the imaged fiducial within the specified degrees of freedom (four or more in this example). In this manner, the relative location of the workpiece can be more accurately, and readily determined regardless of variations in the rotation and positioning of the workpiece, allowing the workpiece position to be located and corrected to reliably locate the target.

According to a preferred embodiment the machine vision tool is adapted to locate a trained fiducial mark on the workpiece when the workpiece enters an area of interest within a field of view of a camera of the machine vision system. The fiducial is recognized by the tool based upon past training of the tool to recognize selected fiducials. The location of the workpiece is derived by the machine vision system based upon the found location of the fiducial. The found location of the fiducial is compared to the desired location of the fiducial—derived typically from a fixed position at which the workpiece is supposed to be within the area of interest (e.g. the target). If there is a difference between the found location and the desired location, then the difference is transformed using mapping software into an adjustment value within the robot's coordinate reference system. The difference is generally resolved into values along a plurality of axes/rotations.

In a preferred embodiment the transformed adjustment factor from the machine vision system is provided to the robot controller. Based upon the robot control software application, the adjustment information is used to move the workpiece along each of the coordinates/rotations in which a difference is determined in order to position it closer to the actual desired position. The fiducial is again found, and compared, the process repeating until the difference is less than a predetermined minimum value near zero.

In one embodiment, the transformation function provides an under-correction with respect to actual difference to reduce the possibility of overshoot of the desired position during correction. The process therefore repeats, making continuously smaller position adjustments, until the desired workpiece position is essentially attained.

In addition, the robot can be commanded to accomplish two moves during each adjustment/movement cycle so as to approach a target from the same direction in order to accommodate gear backlash. The first motion command can, for example, instruct the robot to move the workpiece to the right of the desired/target position, then the second motion command instructs the workpiece to the desired/target position.

The workpiece can comprise a part to be moved from one location to a target location. Alternatively, the workpiece can be a tool that performs a job at the target location or any other object held by a robot arm that can be identified by the machine vision system based upon a distinct pattern or fiducial thereon.

BRIEF DESCRIPTION OF THE DRAWINGS

The foregoing and other objects and advantages of this invention will become clearer with reference to the following detailed description as illustrated by the drawings in which.

DETAILED DESCRIPTION OF AN ILLUSTRATIVE EMBODIMENT

Figure 1:
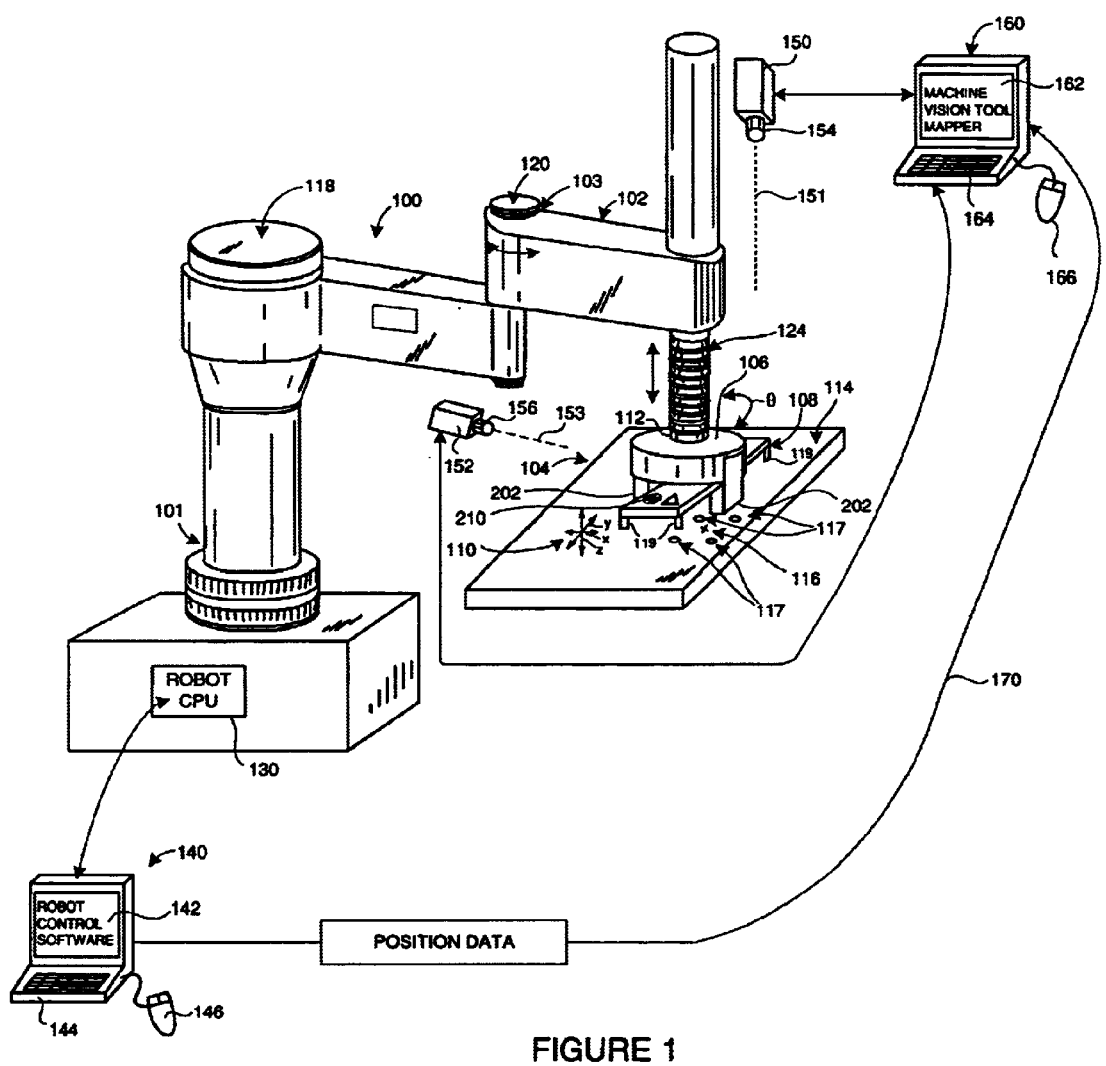
FIG. 1 is a schematic perspective view of a robot assembly and associated work-piece, hel in the robot end effector, and including a machine-vision-based servoing system interacting therewith according to a preferred embodiment of this invention.

FIG. 1 shows an exemplary robot assembly 100, mounted on a base 101, including a manipulator unit 102 having a multi-jointed arm 103 capable of moving an end effector 104 in at least four degrees of freedom-along three orthogonal axes (axis arrows x, y and z(scale)), and one rotation (curved arrow θ). The end effector 104 is provided with a gripper assembly 106 that enables engagement with, and disengagement from, a work-piece 108. The end effector 104 is movable by robot control commands along the three linear axes x, y and z, as shown generally by the set of axis arrows 110. The transverse x and y-axes are typically within the viewed plane perpendicular to the camera axis and an orthogonal z-axis is typically a distance/scale coordinate with respect to the camera. In addition the end effector includes a rotating wrist 112 that enables rotation (curved arrow θ) relative to the manipulator arm 103 with the rotation axis generally perpendicular to the plane defined by the x and y-axes (e.g. about the z-axis). In this example, the end effector 104 operates generally within a work area 114 that includes a target point 116 to which the end effector is guided. The exemplary target point 116 herein is the center of a set of spaced-apart alignment holes or orifices 117 into which the workpiece 108 must be accurately placed. Note the corresponding alignment rods 119 for engaging the holes 117. The exact configuration of the workpiece and its target is widely variable. The workpiece can be a threaded screw, with an associated target threaded hole; a semicon-semiconductor wafer and process location; a web and associated applique; a laser and associated weld joint; or any other arrangement in which a workpiece must be accurately located with respect to a target for a predetermined time.

Note that the exemplary robot arm joints 118, 120 enable end effector movement within the x and y-axes, while the vertical rail 124, carrying the end effector 104 at the bottom thereof enables end effector movement along the z-axis. The exact arrangement and number of arm components is highly variable. For example, in an alternate arrangement z-axis movement can occur at the robot base, rather than at the end effector-support rail (124) as shown. In another alternative, movement in one or more axes can be implemented by moving tracks extending parallel to the desired axis.

Control of the robot assembly is provided by a robot central processing unit (CPU) 130 that communicates with various conventional actuators (servos, pneumatic cylinders, stepper motors, etc.) that physically translate the end effector within the work area 114; and conventional movement, position and force sensors that locate relative position and status of the end effector as it moves. The CPU 130 translates movement commands into physical movement signals for the end effector, and verifies that the commanded movements are executed correctly. A control interface, comprising a computer 140, is interconnected to the robot control CPU 130. The computer 140 includes a display 142 and a graphical user interface having a keyboard 144 and mouse 146. The specific arrangement of components and configuration of the control interface can be varied. Control software resides on the interface. Note that the term "software," as used herein refers generally to any number of actions and data structures, whether implemented by a general-purpose processor or any an application-specific or custom processor (example—firmware). The robot control software accepts and provides control movement data to the robot, and analyzes status data. The training of a robot to move through a series of motions to the target 116 is accomplished using the control software. This generally entails the manual or automated movement of the end effector through a pathway while the robot controller monitors the position and status. When the target is reached, the position and orientation of the end effector is marked in the robot control software database. This can be marked particularly by a three-dimensional coordinate value (x, y, z) and a rotation (θ) with respect to an arbitrary coordinate system used by the control software. Once movement is trained, the end effector 104 moves along a pre-programmed course, based upon feedback from its sensors to the target 116.

Note that the robot assembly 100 of this embodiment is exemplary only, and any form of manipulator that engages and moves a workpiece can be substituted. As noted above, the term "workpiece" should be taken to include such tools. Additionally, the term "robot" should generally be taken broadly to include any such device that moves a workpiece along a programmed or controllable path.

The machine vision system of this invention also includes one or more camera assemblies 150, 152 located to image the work area 114 from various desired reference points. The reference points are chosen to provide sufficient viewing of the at least a portion of the workpiece 108 when it is located at the target point. The optical axis 151 of the camera 150 is aligned on or near the z-axis for a relatively accurate image of distance along the z-axis. The optical axis 153 of the camera assembly 152 is located between the x and y-axis image plane and z-axis so as to enable viewing of the target area and other portions of the robot/work area configuration that may not be well viewed at certain times by the on-axis camera 150. The number of camera assemblies used is highly variable as is their relative placement. The camera assemblies 150, 152 each include lenses 154, 156 that are focused to adequately view the workpiece and a region of interest around the workpiece when it is within the area of the target. The area may be relatively small if the target is isolated to a single region, or larger if multiple targets are provided at a distance therebetween. Multiple cameras can also be focused on multiple areas of interests/targets within the work area, and each camera is selected as the workpiece moves in to the particular area of interest. Typically, control of the robot along a pathway to the target is sufficiently accurate based upon the robot control software so that the visual guiding of this invention is utilized for final positioning only. However, cameras can also be provided along other portions of the movement pathway to ensure accurate guidance therealong. In general, camera placement enables a particular fiducial to be viewed throughout its range of locations in the area of interest. However, multiple cameras can enable fuller coverage of a given fiducial in certain embodiments (such as multiple cameras 150, 152). In addition, advanced search tools have an increased capability to view partially occluded and variably illuminated fiducials relative to less-advanced machine vision approaches, often enabling a greater range of movement within the chosen camera's field of view.

Each camera assembly also includes image capture/processing elements such as a frame grabber (not shown). The output of the camera assembly is interconnected with the machine vision system computer 160 according to this invention. The exemplary machine vision system computer includes a display 162 having a graphical user interface controlled by a keyboard 164 and mouse 166. Again, any acceptable configuration can be employed for the machine vision computer. As noted above, the machine vision system of this invention is any search tool adapted to register a pattern, based upon a trained image thereof, transformed by at least three degrees of freedom—at least two translational degrees (x and y axes/plane) and at least one non-translational (preferably rotation θ in the x-y plane or z(scale)). As referenced above, one such search tool that registers transformation of an acquired image by at least four degrees of freedom including the two translational degrees (x, y) and two non-translational degrees (rotation θ and z(scale)) is the rotation/scale-invariant search (RSIS) tool.

Note by "translational" it is meant, viewed linear displacement in an image plane clearly viewed by the camera, while "non-translational" means a change in the viewed image outside the parameters of the image plane such as general rotation of the image, change in size/scale due to movement toward and away from the camera, change in aspect ratio (rotation outside the plane in one axis lying in the plane) and change in skew (simultaneous rotation outside the plane in two planar axes). Note that adequate feedback by the search tool for certain movements by the robot may not be available—if the degrees of freedom registered by the search tool are limited (e.g. scale or rotation is not registered). If so, other techniques can be employed for tracking and controlling movements of the robot that are not adequately registered.

Additionally, while the term degrees of freedom is used to describe both the image reference system (machine vision view) and the robots movement capabilities, the two reference systems are not necessarily aligned. For the purposes of this description, the x and y axes of the robot are generally coincident with the image plane of the over-head camera 150, while the z-axis of the robot is coincident with the z(scale) direction of the machine vision system (a non-translational degree of freedom). Likewise, the rotation of the workpiece 108, based upon corresponding end effector rotation, is coincident with the machine vision rotation (non-translational) degree of freedom ($\theta$). Therefore the values x, y, $\theta$, z(scale) are used herein to denote both the image degrees and coincident robot degrees. It is expressly contemplated that the robot degrees of motion may occur along different axes, or in a plurality of additional degrees greater than four, that are viewed in the image plane as transformations along the image degrees (x, y, $\theta$ and z(scale)). It is desirable mainly that the machine vision system be able to register the transformation of the workpiece appropriately between positions/orientations within the image system's defined degrees of freedom.

In general, the search tool described herein uses scale measurements to determine non-translational (z-axis) distance. It is expressly contemplated that more advanced scale determination can be employed. For example the use of multiple cameras and/or multiple fiducials to triangulate multiple search tool results is described in U.S. patent application Ser. No. 09/738,564, filed on Dec. 15, 2000, entitled SYSTEM AND METHOD FOR LOCATING AN OBJECT IN THREE DIMENSIONS BASED UPON MULTIPLE FIDUCIALS USING MACHINE VISION by Aaron S. Wallack, the teachings of which are expressly incorporated herein by reference. Similarly, a ranging camera that provides both translational (x, y) and z-axis range data (via radar, sonar, coincidence range finding, etc.) as gray data for more accurate distance determination can be used according to U.S. patent application Ser. No. 09/738,962, filed on Dec. 15, 2000, entitled SYSTEM AND METHOD OF USING RANGE IMAGE DATA WITH MACHINE VISION TOOLS also by Aaron S. Wallack, the teachings of which are expressly incorporated herein by reference.

In this example, an RSIS tool capable of registering both scale and rotation is used. The tool and associated software reside on the machine vision computer 160. As noted above, this RSIS tool can be part of a commercially available machine vision system such as the well-known Patmax® system and associated software available form Cognex Corporation of Natick, Mass. Patmax® has the capability of registering transformation of an image by at least five degrees of freedom, including the four degrees described above, as well as, for example, aspect ratio. It is expressly contemplated that any acceptable system having the ability to perform a three-degree-of-freedom, or greater, pattern registration can be used herein, including the above-referenced Hexavision® system. Accordingly, the term "search tool" is used herein to describe such machine vision system tools.

In general, the search tool described herein uses scale measurements to determine non-translational (z-axis) distance. It is expressly contemplated that more advanced scale determination can be employed. For example the use of multiple cameras and/or multiple fiducials to triangulate multiple search tool results is described in U.S. patent application Ser. No. 09/738,564, filed on Dec. 15, 2000, entitled SYSTEM AND METHOD FOR LOCATING AN OBJECT IN THREE DIMENSIONS BASED UPON MULTIPLE FIDUCIALS USING MACHINE VISION by Aaron S. Wallack, the teachings of which are expressly incorporated herein by reference. Similarly, a ranging camera that provides both translational (x, y) and z-axis range data (via radar, sonar, coincidence range finding, etc.) as gray data for more accurate distance determination can be used according to U.S. patent application Ser. No. 09/738,962, filed on Dec. 15, 2000, entitled SYSTEM AND METHOD OF USING RANGE IMAGE DATA WITH MACHINE VISION TOOLS also by Aaron S. Wallack, the teachings of which are expressly incorporated herein by reference.

The search tool is accessed and operated using the interface and display of the computer. The cameras 150, 152 feed image data into the computer, with which various machine vision analysis are made in conjunction with the normal operation of the search tool. As described further below, the data gathered by the search tool on the workpiece is translated or transformed by the computer 160 using a mapper, that interfaces with the data derived by the search tool, into position data that is delivered via interconnection 170 to the robot control computer 140. The data is used to verify position of the workpiece relative to the target, as also discussed further below.

Figure 2A:
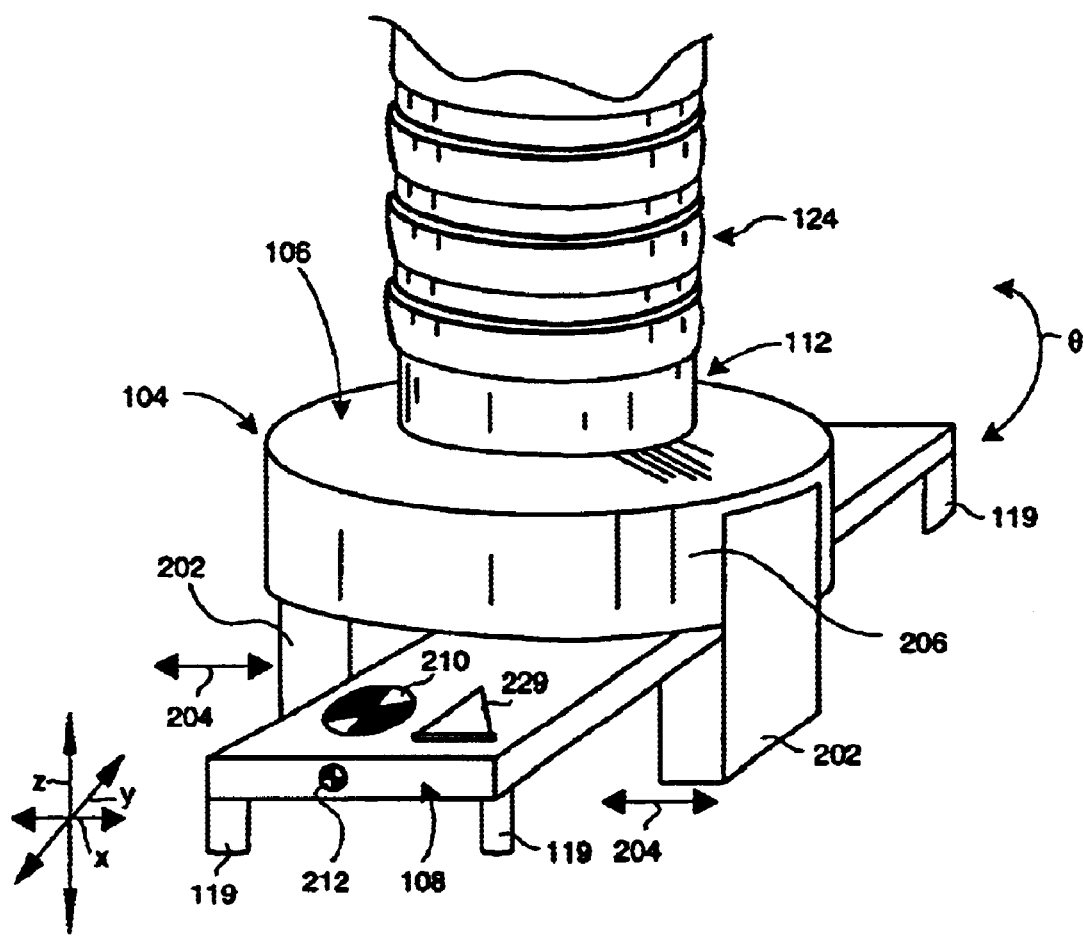
FIG. 2A is a more-detailed schematic perspective view of the end effector and associated workpiece of the robot of FIG. 1 detailing a plurality of exemplary fiducial marks for use by the machine vision system of this invention.
Figure 2B:
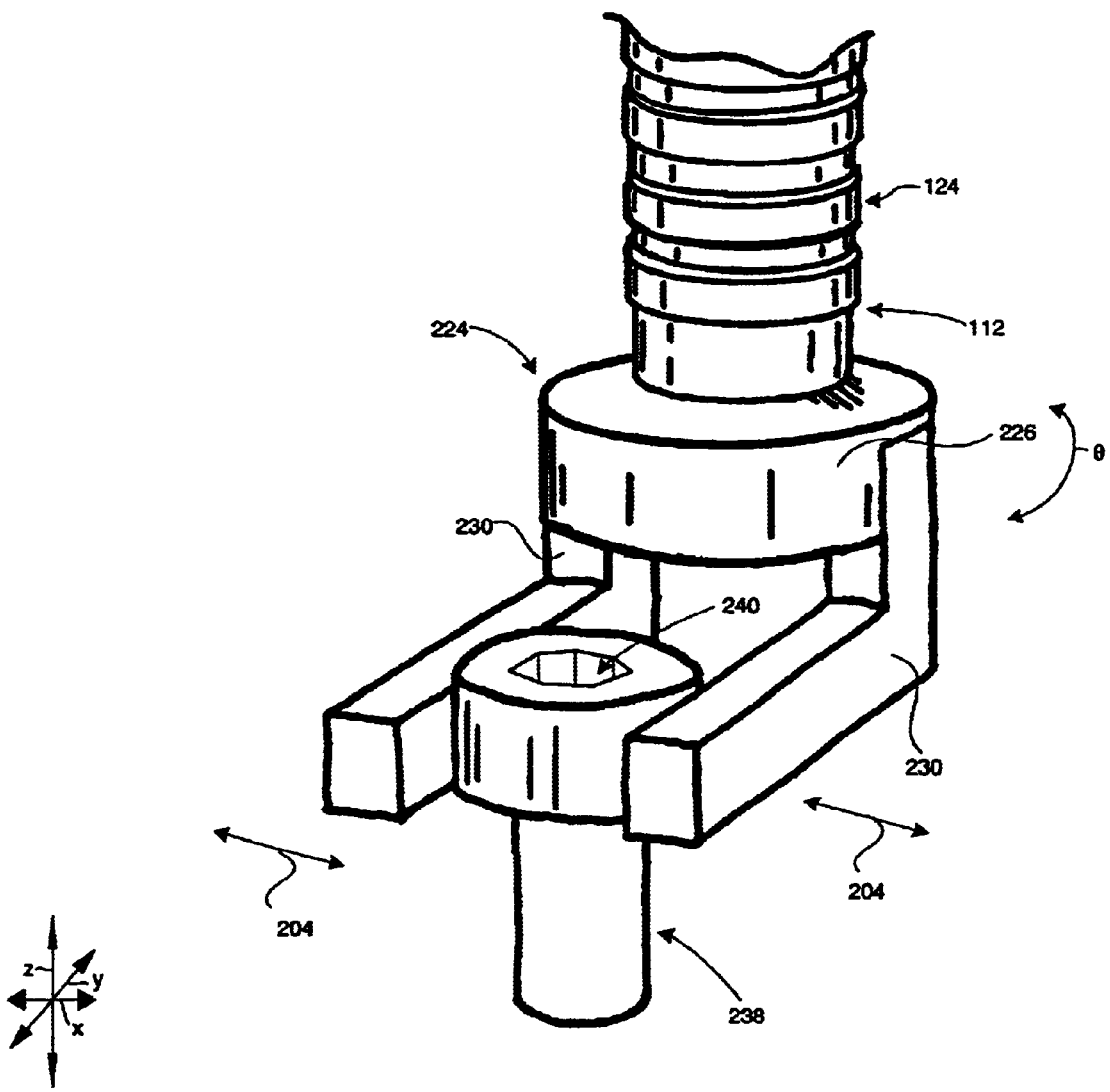
FIG. 2B is a more-detailed schematic perspective view of an end effector and associated workpiece in which the fiducial has a top-mounted fiducial according to an alternate embodiment of this invention.
Figure 2C:
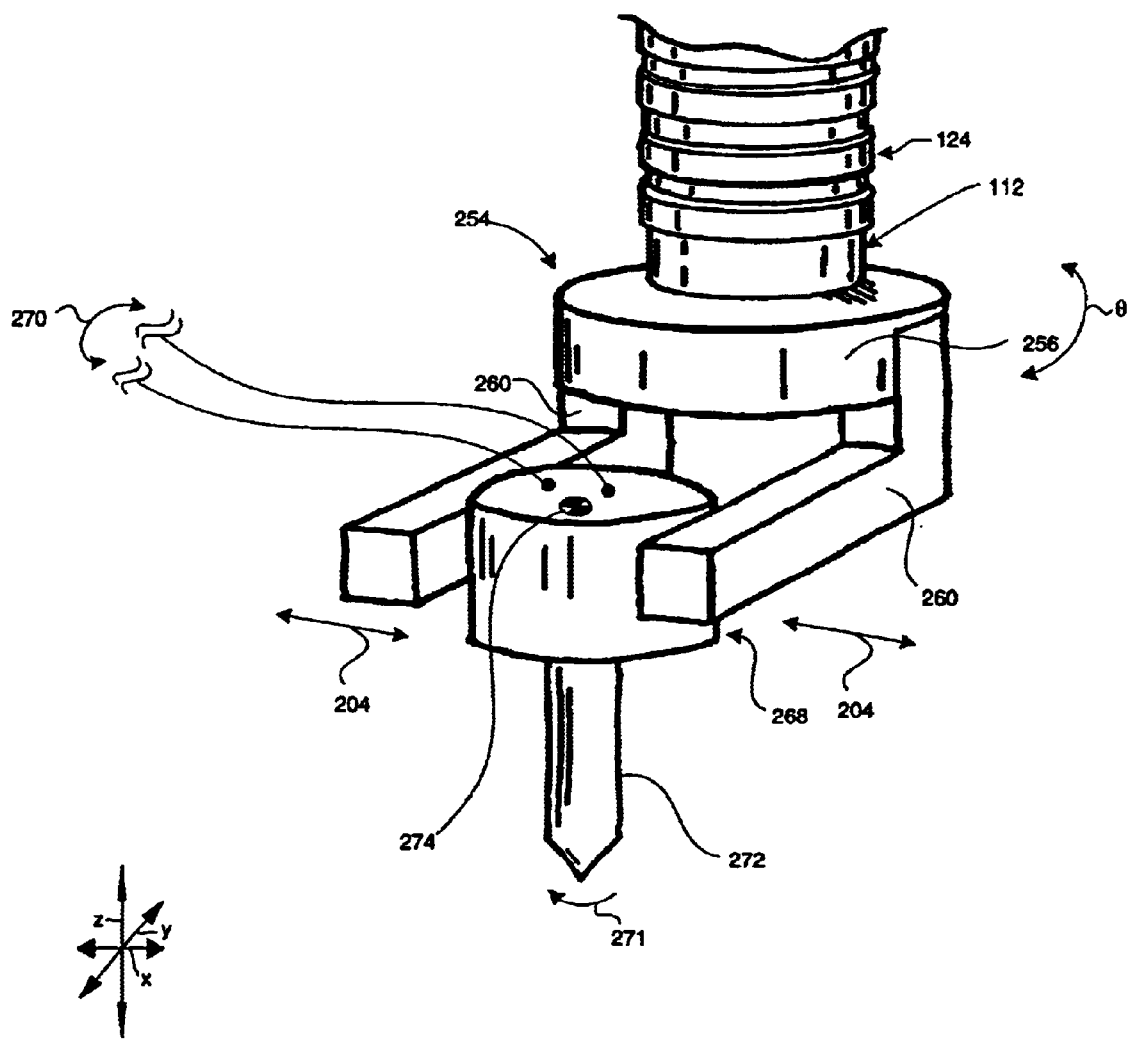
FIG. 2C is a more-detailed schematic perspective view of an end effector and associated workpiece in which the workpiece comprises a tool according to an alternate embodiment of this invention.

In FIGS. 2A, 2B and 2C, the characteristics of the end effector and associated workpiece for each of a plurality of alternate embodiments are described in further detail.

While the shape and operative mechanism of the end effector are somewhat arbitrary, specific examples are shown and described for illustration purposes. It is expressly contemplated that any shape or type of end effector capable of holding and manipulating a workpiece can be provided.

Referring first to the embodiment shown in FIG. 2A (also shown in FIG. 1), the gripper assembly 106, includes at least two gripper fingers 202 that move (double arrow 204) is provided beneath for selectively gripping the workpiece 108. The gripper fingers 202 can include appropriate cutouts and/or shapes specifically sized to engage a particular workpiece, or the fingers can be more-universal in shape. Grippers can also include vacuum units that hold parts in place using suction that is engaged and disengaged at selected times. Magnetic or electromagnetic grippers can also be employed for workpieces that are attracted by magnetism. In alternate embodiments, such as a wafer handler, the gripper can be omitted in favor of a fixed platter or fork. The main body of the end effector 206 supports the gripper 106, and is, itself, supported by a rotating wrist joint 112. The wrist joint enables rotation (curved arrow $\theta$) of the main body 206 relative to the manipulator arm 103. The precise configuration of joints is also arbitrary. In general, the end effector can move along a number of axes (x, y, z, $\theta$) based upon a variety of underlying robot jointing structures.

Referring further to FIG. 2A, located on the workpiece 108 are fiducial marks 210 and 212. In one embodiment, these marks are printed or otherwise-applied circles with alternating dark and light color quadrant wedges therein for positive identification. The exact size, shape and makeup of the fiducials can be varied widely. The illustrated designs are exemplary only. Fiducials can be located at only one visible position on the workpiece, or at several positions as shown. Fiducials can also be optionally mounted on one or more sides/surfaces of the workpiece (see side-mounted fiducial 212, for example). Multiple fiducials may be desirable when a single fiducial is not in direct view of a selected camera at certain critical times or when multiple fiducials are used to enhance registration of the workpiece along the z-axis (for example). Fiducal extensions (not shown) can also be attached to the workpiece using adhesive, fasteners and the like. Such extensions can include a small plastic or metal bracket positioned on the workpiece in a location that is in the field of view of a selected camera throughout a desired range of workpiece movevments. The extension should remain fixed to the workpiece so as to prevent unwanted vibration or dislocation of the fiducial during normal workpiece movement by the end effector as in a location that does not interfere with the operation. In addition to a standardized fiducial pattern as shown, another structure or design on the workpiece, such as a unique outline, logo or distinctive physical structure (raised triangle 220, for example) can be used as a fiducial pattern. Each fiducial is, in essence, a design that is readily recognized by the search tool as such, and which the search tool can register upon as a reference. The positioning of fiducials is selected so that one or more of the cameras can capture a sufficient image of the fiducial throughout the desired range of workpiece movement.

For the search tool to register upon a workpiece fiducial, it must be visible to a selected camera during critical times, typically when the workpiece is at or near the target area in a proper orientation. In FIGS. 1 and 2A, the exemplary workpiece includes the fiducial 210 and fiducial-like structure 220 that are on a portion of the workpiece exposed generally to the camera. However, the end effector can take any form. Accordingly, FIG. 2B shows an end effector 224 includes a main body 226 carrying gripper arms 230 that extend outwardly from the rail 124. Hence, the ends of the gripper arms 226 movably (arrows 204) engage the workpiece (screw or bolt 238) in a location more prominently within the field of view of the camera (150). In this embodiment the head of the exemplary workpiece bolt 238 includes a drive cutout 240 with a recognizable perimeter outline. It is contemplated that this outline can comprise a "fiducial as defined herein. Note that the entire head outline, including the inner cutout can also define a fiducial according to this invention. A predetermined pattern using paint or another coloring agent can also be applied to the workpiece bolt 238 to further orient the head with respect to the coordinate reference system of the search tool. In general, one or more formed "witness mark(s)" can be applied to the head to provide additional reference points to the fiducial 240.

As described generally above, the workpiece can comprise any element that is manipulated by a robot about a work area relative to a target. FIG. 2B shows an end effector 254 having a main body 256 for supporting extended gripper arms 260. The arms 260 movably (arrows 204) engage a tool 268 that comprises the "workpiece" according to this embodiment. The workpiece tool 268 is a drill or other powered drive member (note power leads 270) that acts upon the target area with a moving (curved arrow 271) tool head 272. A fiducial mark 274 registers the workpiece tool 268 with respect to the search tools reference system, and hence, to the target. The tool's shape, logo or markings can also comprise a fiducial plurality of fiducials according to this invention.

A generalized procedure for using workpiece fiducials to servo the robot is now disclosed in further detail. Prior to operation of the robot, the chosen fiducial must first be recognized by the search tool; whether it is a specific mark, outline shape or prominent structure. This entails training of the search tool to recognize one or more fiducials on the workpiece. Note, each fiducial may be distinct, allowing the tool to recognize each fiducial independently, and associate it with a particular location on the workpiece. The pattern for each fiducial must be loaded into the search tool to "train" the search tool to thereby recognize the particular fiducial. The training can be a one-time process at machine setup, or may be carried out at various times as required. In the basic embodiment to be described a single fiducial pattern is trained. However, the training procedure can be employed multiple times to recognize multiple fiducials.

Figure 3:
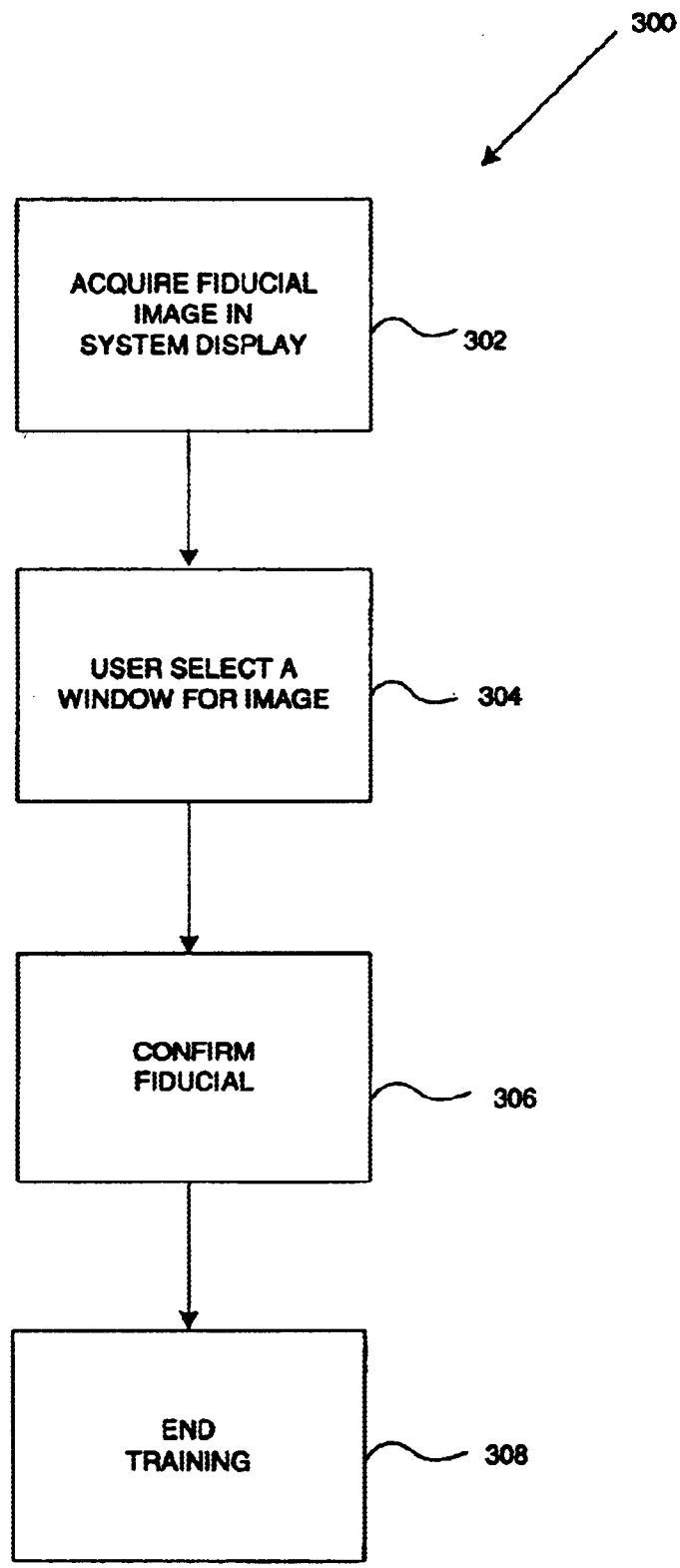
FIG. 3 is a flow diagram of a generalized training procedure for the machine vision system of this invention.

FIG. 3 details a procedure 300 for training the search tool to recognize a specific fiducial pattern according to an embodiment of this invention. First, the selected fiducial is "acquired" by one of the imaging cameras, as set forth in step 302. The acquisition of a fiducial pattern can entail the direct viewing of a fiducial on the workpiece under desired conditions (e.g. perpendicular to the axis of the camera and at a known distance/scale), and capture of the viewed image on the computer system display screen 162 by the user. For direct-view training, the workpiece should be mounted in the grippers so that the fiducial is in the desired camera field of view, and usually mounted at the standard engagement position with respect to the grippers. Alternatively, a printed sheet containing the fiducial, or another sample can be placed within the camera's viewing area at an appropriate distance, where direct viewing of the workpiece is not used for training. For example, a printed reproduction of the screw head can be used to train the search tool.

Once an image of the fiducial is placed in the camera field of view, the user then selects a window for the image containing the fiducial according to step 304. The selection generally entails use of the graphical user interface to outline the area in the captured image directly surrounding the viewed fiducial, with minimal surrounding detail so as to minimize the effect of other patterns or structures surrounding the fiducial. Note that the acquisition and selection of a fiducial (steps 302, 304) can comprise the retrieval or downloading of a stored image of the fiducial where a standardized or previously acquired image is used. For example, for the depicted, somewhat conventional circular fiducial (212, 214, 216), a standard image may be preloaded in the search tool, and the user accesses this fiducial pattern by calling up the appropriate image file. Likewise, a "trained model" derived from an earlier training session can be downloaded from a storage site. The user thereby restores the trained pattern and avoids the necessity of engaging in the overall training procedure.

Once the fiducial is captured and selected, the user confirms his or her choice (step 306), and directs the training procedure to end (step 308). The search tool is now capable of recognizing the fiducial in a variety of orientations and distances/scales. The search tool must now be calibrated to provide displacement and location data with reference to an internal coordinate system.

Figure 4:
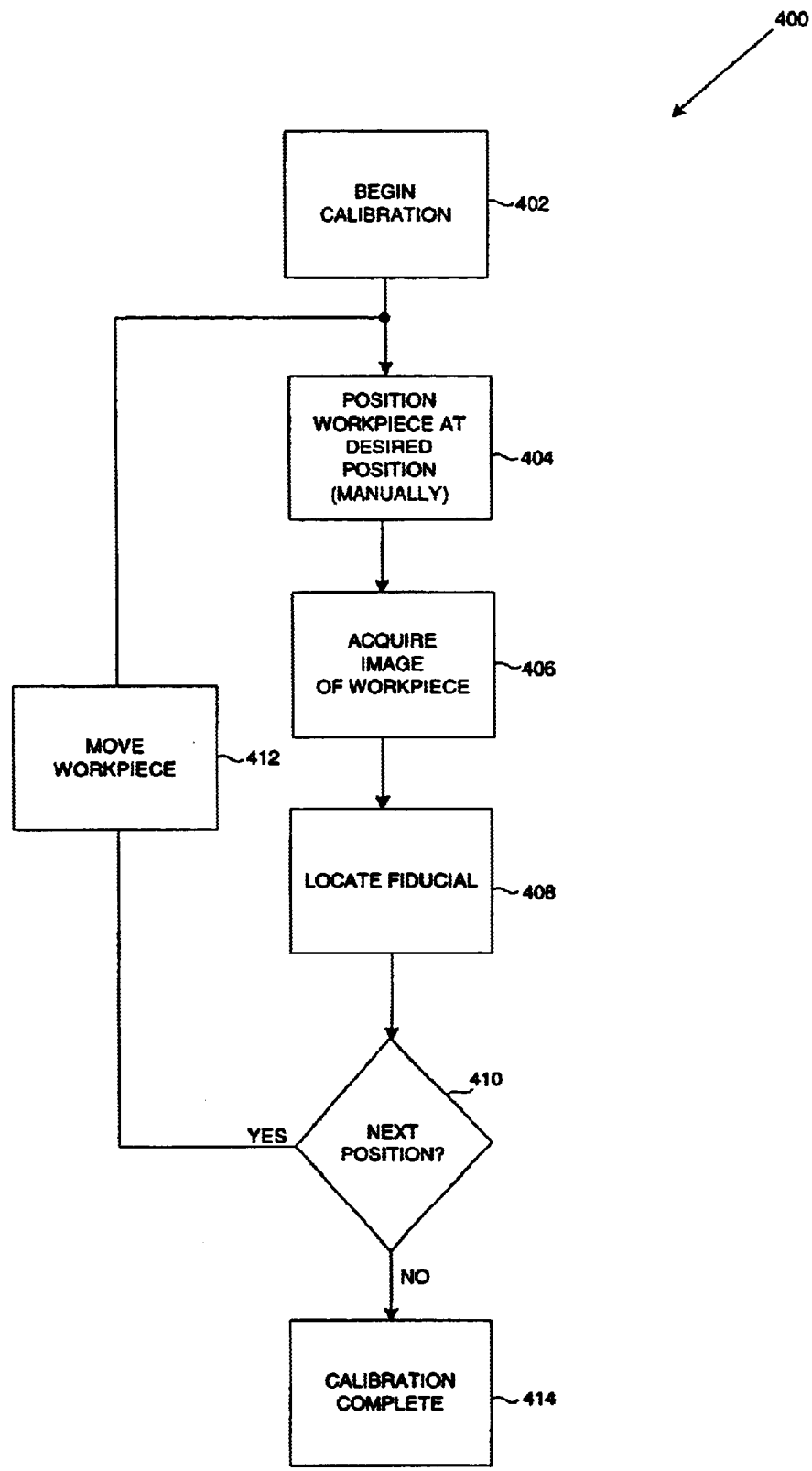
FIG. 4 is a flow diagram of a generalized calibration procedure for a machine vision system of this invention.

FIG. 4 details an exemplary calibration procedure 400 according to an embodiment of this invention. The user inputs the appropriate calibration command into the user interface (step 402). In one embodiment, calibration is accomplished manually by moving the end effector carrying the workpiece (and its fiducial) in a desired orientation using, for example, the robot control software through a series of movements. In this embodiment, the workpiece is first positioned at a predetermined location within the field of view of the camera (step 404). This location can be an arbitrary position, or it can be directly referenced to the target point or another standard location. Once the workpiece is positioned, an image of the workpiece is acquired by one or more of the cameras (step 406). Note that, for multiple cameras, the procedure 400 can be repeated for each camera.

Note that the relative position of the workpiece with respect to the end effector may be required for proper servoing. An additional step that can be employed, if the end effector includes a rotating wrist (wrist 112, for example) is to rotate workpiece, and average the found fiducial locations. Since the workpiece should rotate symmetrically about the wrist's center of rotation. Since the position of the end effector within the robot's reference system is known, deducing the center of rotation enables the offset between the workpiece and the center of the robot's wrist to be determined. In other words:

1. Command the end effector orientation to θ=0 and record (x, y, θ, z(scale)).
2. Command the end effector to θ=180 and record (x, y, θ, z(scale)).
3. Average the recorded values for the two x, y, and z(scale) readings and deriver therefrom the center position for the end effector and relative offset of the workpiece. Add this value to the transform for calibration. Other techniques for determining offset can also be employed, such as comparing the workpiece location to another fixed position, on the end effector.

According to step 408, the fiducial on the workpiece is then located. This can be accomplished manually using the user interface, or, preferably, automatically, using the search tool. Where multiple fiducials are located on the workpiece, one is singled out for calibration, or, if possible, all are simultaneously acquired by the search tool. The location process generally entails the fixing of the fiducial(s) to an internal reference point within the tool. This point can be based upon x, y and z axes, as well as rotation, based upon the inherent capabilities of the search tool to resolve a viewed pattern for multiple axes and distances/scales.

Typically, a predetermined number of defined moves for the workpiece are accomplished. Decision step 410 determines whether another move is desired. Each new move of the workpiece (step 412) repeats the above-described position, image-acquisition and fiducial-location steps 404, 406 and 408, respectively. Each predefined movement of the workpiece is made over a known distance and direction (displacement vector) in each of the coordinate directions and rotations so that the image of the fiducial in a variety of positions and orientations can be sampled by the search tool. The search tool correlates the viewed position and orientation of the fiducial at various sample points with position data derived from the robot. This data can be read from the robot controller display, and manually entered by the user as each movement is made, or the position data can be part of a programmed movement regime within the search tool that the user instructs the robot to follow. In general, known locations for the workpiece, based upon movements, are compared to viewed images of the fiducial in order to determine the location in each of the desired axes/rotations. After a desired number of movements have been made and sampled, the calibration is indicated as complete (step 414). Given the derived location information, the tool is then ready to approximate (interpolate) intermediate positions between the sampled positions so as to accurately determine the position of the workpiece at any given location. This procedure is described further below.

Figure 5:
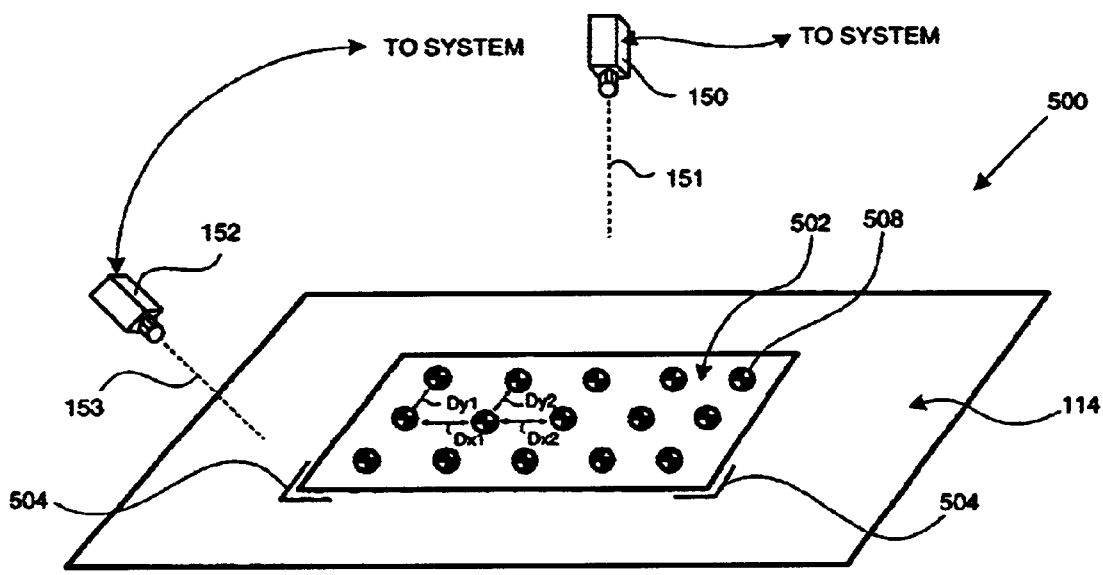
FIG. 5 is a schematic perspective view of an embodiment of a test target-calibration procedure for the machine vision system of this invention.

FIG. 5 details an alternate setup 500 for performing calibration. This procedure can be used in conjunction with the manual procedure 400 described above, or can be used in the alternative. A calibration "test pattern" 502 printed on a plate, card or other surface is located relative to the field of view of the system camera or cameras 150, 152. In this embodiment, the card is positioned at a predetermined location on the work area 114. Note that optional reference marks 504 can be provided to the work area to assist in aligning the test pattern 502. A plurality of fiducials are printed at known intervals (Dy1, Dx1, Dy2, Dx2, etc.) on the test pattern 502. The displacements between printed fiducials 508 can be varied by known amounts. Similarly, the scale, size and rotational orientation of each fiducial within the pattern can also be varied by known amounts. Alternatively, all spacings and sizes can be identical, and/or the orientation of the overall test pattern with respect to the viewing camera can be varied. The search tool is directed to acquire each of the fiducials and correlate its "known" orientation and location with an internal reference value within the search tool. The fiducials can be scanned automatically, in turn, based upon a preprogrammed routine, in which the known displacement and orientation represented by each fiducial is known by the search tool, or each fiducial can be individually acquired by the user, and the relative position and orientation can be input by the user.

Note that another alternate calibration technique involves a calibration object having a three-dimensional arrangement of trained patterns/fiducials. This calibration object and the associated method of use are disclosed in commonly owned U.S. patent application Ser. No. 09/738,563, filed on Dec. 15, 2000, entitled MACHINE VISION CALIBRATION OBJECT AND METHOD FOR CALIBRATING MACHINE VISION SYSTEMS by Aaron S. Wallack, which is expressly incorporated herein by reference, and which can be employed generally to accomplish training of the search tool according to an alternate embodiment of this invention.

Figure 6:
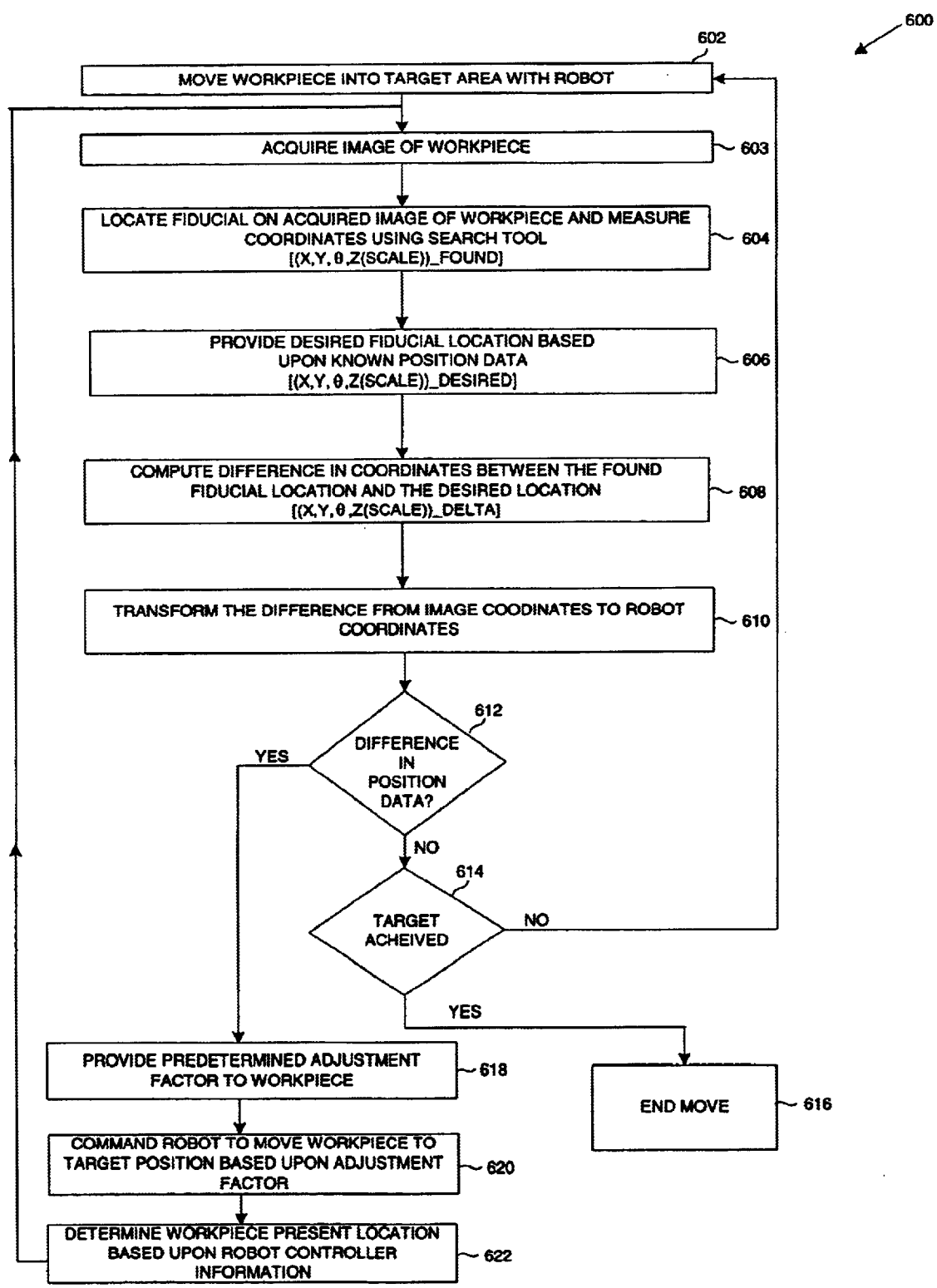
FIG. 6 is a flow diagram of the robot servoing procedure using the machine vision system according to a preferred embodiment of this invention.

Having described the training and calibration procedures according to an embodiment of this invention, the servoing procedure for the robot carrying the workpiece, using the search tool, is now described in detail. FIG. 6 shows the servoing procedure 600 according to an embodiment of this invention. The end robot is commanded by the robot control software to move the workpiece along a defined path into the general area of the target point according to step 602. At a predetermined location, the workpiece enters the field of view or area of interest of one or more of the system cameras. An image of the workpiece is then acquired by the camera in order to register a fiducial (step 603). If more than one camera is used, and each acquires an image of the workpiece at once, the machine vision software can use a scoring technique to determine which camera view is to be used for servoing. For example, each of two or more cameras acquire a view of a given fiducial (or multiple fiducials). The camera view of a given fiducial that is most clear, complete, and perpendicular to the camera axis, is given the highest score. Various properties, such as scale, clarity, perpendicularity and the like can each be given discrete scoring parameters. The parameters can be combined to determine overall score, with separate parameters given either equal weight, or varied weighting within the overall combination.

Once an image has been positively acquired and selected, the search tool of the machine vision system is prompted to locate the coordinates of the acquired fiducial on the workpiece (step 604). A measurement of the found coordinates of the fiducial with respect to an internal coordinate system of the search tool is made, and is denoted herein as coordinates (x, y, θ, z(scale))_found, where location along the z-axis is representative of distance or scale. Note that this example uses four coordinates including three orthogonal movement axes and one rotation. This coordinate system can be based upon the location of the target point or another absolute point of reference. Note that the target point can be separately located using the search tool and fixed as the relative point of reference. The recognition and location procedures described herein can be employed to enable fixation of the target point as a reference.

Having found the relative position of the workpiece fiducial, the desired fiducial location is then determined as set forth in step 606. This coordinate value is denoted as (x, y, θ, z(scale))_desired. In general, the position data can be a standard position value such as a fixed position relative to the target. The robot arm is automatically directed to go to an exact position at which image acquisition occurs, and that position is known by the machine vision system and appropriately transformed (refer below) into coordinates relevant to the search tool's internal coordinate system. Alternatively, the desired position can be directly derived from position data fed from the robot controller (e.g. movement command data adapted to move the robot to a desired position). The mapper function residing in the computer 160 can be used to predict the image location corresponding to the robot position so that there is no need to acquire an image of the workpiece at a particular position in order to run servoing according to this invention. In any case, the desired fiducial location is a coordinate location at which the workpiece fiducial should reside if the workpiece is accurately positioned.

Note that the present embodiment utilizes to relative motions in which a given relative image position corresponds to a computed relative robot position. However, it is expressly contemplated that absolute image position can be mapped to a computed absolute robot position.

The difference between the found fiducial location ((x, y, θ, z(scale)) found) for the workpiece and the desired fiducial location ((x, y, θ, z(scale))_desired) is then computed by an appropriate computation software to determine the actual difference ((x, y, θ, z(scale))_delta), if any (step 610). This is the amount by which the workpiece is translated in each of the given coordinates from the desired robot location including an appropriate direction along each axes (typically denoted positive or negative within the reference system). The difference value ((x, y, θ, z(scale))_delta) is herein termed a displacement vector as it includes direction and magnitude along each applicable axis/rotation.

The difference value/displacement vector ((x, y, θ, z(scale))_delta) is then transformed using the mapping software (mapper) from coordinates in the machine vision (image) reference system into a displacement vector characterized by coordinates relevant to the robot controller so as to enable adjustment of the workpiece in accordance with the transformed value. An exemplary procedure for transforming coordinates from the image to robot reference system is described in further detail below.

Referring again to the servoing procedure 600, the transformation in step 610 branches to decision step 612 in which the software determines whether any significant difference between the desired and found position exists. If no significant difference exists (e.g. (x, y, θ, z(scale))_delta=0), then the procedure queries whether the workpiece has arrived at its target (decision step 614). If the target has been achieved, then the decision step 614 branches to the end 616, and movement ceases.

If the target has not yet been achieved, then the procedure loops (via decision step 614) so that movement continues (step 602), and the procedure steps 602–614 repeat.

However, if the found location of the workpiece, as determined by the search tool, is sufficiently different from the desired location (e.g. (x, y, θ, z(scale))_delta≠0), then an adjustment factor (vector quantity) is computed is to compensate for the difference according to step 618. The amount of compensation can be made based upon the exact difference, or upon a fixed movement increment along one or more coordinate axes and/or rotations. The adjustment factor transferred from the machine vision system to the robot is a value that is useable by the robot controller's reference system. The transformation procedure for obtaining this value is described below.

Note that it may be desirable to provide an undercorrection in the transform function (e.g. only 80% of actual required movement) so that the workpiece does not overshoot its target. In this manner the workpiece is moved progressively closer to the target with each iteration of the procedure until the measured difference between found and desired location approaches zero.

In addition, the robot can be commanded to accomplish two moves during each adjustment/movement cycle so as to approach a target from the same direction in order to accommodate gear backlash. The first motion command can, for example, instruct the robot to move the workpiece to the right of the desired/target position, then the second motion command instructs the robot to move the workpiece to the desired/target position.

Once an adjustment factor has been computed according to step 618, the robot is commanded, via the robot controller, to move the workpiece to the target based upon this adjustment factor (step 620). The adjusting move of the workpiece can entail a correction implemented during actual movement, or a correction made after the workpiece has come to a stop. In fact, based upon the computational speed generally available to the system, it is possible for a succession of adjustment moves to be computed and commanded during a given workpiece movement cycle.

Because each computed adjustment can cause a corresponding change in actual in robot position, the new reported position of the workpiece based upon the robot controller's internal reference is acquired by the system (step 622), and used to update data for the next workpiece position determination according to steps 603–614.

Note that it may be desirable to "strobe" the acquisition of the fiducial according to step 603 so that the fiducial will appear clearly in the image if the robot is moving. In other words, the image is acquired at relatively constant (often rapid) intervals during movement. If strobed image acquisition is employed, the exact location of workpiece in the robot reference system at the moment each strobe is taken should be recorded.

Having described a general servoing procedure, a procedure for transforming image coordinates used by the search tool into robot controller coordinates is now described in further detail. This method can be taken in conjunction with the above-described calibration procedure which references FIG. 4. It should incorporate the offset value derived based upon the averaging of fiducial locations, in which the averaging determines the end effector center (described above).

1. The workpiece is moved by the robot to approximately the desired "base" location and the fiducial is located using the search tool. This location is denoted (x, y, θ, z(scale))_base.
2. The workpiece is moved a predetermined displacement dx along the robot x-axis. The fiducial is then located, and the location is denoted (x, y, θ, z(scale))_x-axis.
3. The workpiece is returned to the base location, and then the workpiece is moved a predetermined displacement dy along the robot y-axis. The fiducial is then located, and the location is denoted (x, y, θ, z(scale))_y-axis.
4. The workpiece is returned to the base location, and then the workpiece is rotated through a predetermined angle dθ. The fiducial is then located, and the location is denoted (x, y, θ, z(scale))_rot.
5. The workpiece is returned to the base location, and then the workpiece is moved a predetermined displacement dz along the z-axis (scale-axis) The fiducial is then located, and the location is denoted (x, y, θ, z(scale))_z-axis.
6. The following differences in the respective x-axis, y-axis, rot and z-axis relative to the base location are then determined as follows:

(x, y, θ, z(scale))_dx-axis=(x, y, θ, z(scale))_x-axis–(x, y, θ, z(scale))_base;

(x, y, θ, z(scale))_dy-axis=(x, y, θ, z(scale))_y-axis–(x, y, θ, z(scale))_base;

(x, y, θ, z(scale))_drot=(x, y, θ, z(scale))_rot–(x, y, θ, z(scale))_base; and (x, y, θ, z(scale))_dz-axis=(x, y, θ, z(scale))_z-axis–(x, y, θ, z(scale))_base.

7. Construct a four-by-four matrix M in which the columns are dx-axis, dy-axis, drot and dz-axis as follows:

| x_dx-axis | x_dy-axis | x_drot | x_dz-axis |
| y_dx-axis | y_dy-axis | y_drot | y_dz-axis |
| θ_dx-axis | θ_dy-axis | θ_drot | θ_dz-axis |
| z_dx-axis | z_dy-axis | z_drot | z_dz-axis |

8. Construct a diagonal four-by-four matrix N in which the elements are the motions moved from the base positions dx, dy, drot and dz as follows:

| dx | 0  | 0    | 0  |
| 0  | dy | 0    | 0  |
| 0  | 0  | drot | 0  |
| 0  | 0  | 0    | dz |

9. Compute a four-by-four matrix T, which maps from M to N. This matrix maps a column vector of differences in found workpiece locations corresponding to relative robot motions. Note that the offset described above, based upon the spacing of the workpiece from a fixed point (end effector center) can appear as a constant in the robot reference system positions to determine the precise position of the workpiece based upon end effector movement.

In order to map between absolute image positions and absolute workpiece configurations, the desired "base" location and corresponding measured image location (x, y, θ, z(scale))_base is taken into account. Given an absolute image location, the relative difference from (x, y, θ, z(scale))_base is computed. The difference is mapped into a relative robot motion and that motion is added to the desired "base" location.

The procedure described above entails four discrete moves of the workpiece, in each of the applicable degrees of freedom to accomplish calibration. Additional data points may be desirable to minimize errors. However, where more than four displacement values are determined for moves greater than four, there is a greater number of data points than degrees of freedom, thereby creating and "overconstrained" mathematical system of equations. First, the average image position and average robot position are computed. Then, all image positions are normalized by subtracting out the averaged image position. The robot positions are normalized by subtracting out the average robot position. Note that the average image position and the average robot position are remembered so as to compute absolute mapping between image locations and workpiece locations, as described above.

A standard approach for dealing with an excess of data is to apply linear least squares technique. This approach minimizes the sum-squared error between a set of measured data and predicted data. The application of least squares is as follows:
1. Given K equations, construct a K-column by four-row matrix M1 including all image position data.
2. Construct a K-column by four-row matrix N1 including all robot position data.
3. Apply a standard least squares technique mapping M1 to N1 so as to compute the optimal matrix T1, representing the minimization of sum-squared error.

The matrix T1 maps from relative image locations to relative robot locations. This is because image locations and robot locations are normalized by subtracting out the average image location and the average robot location.

It is recognized that rotation about the θ axis of the fiducial can affect the x and y positions of the fiducial non-linearly. Accordingly, the computations for calibration can be separated so that mappings between image and robot translation components ((x, y, z(scale)), (dx, dy, dz)) are separate from the rotation components (θ, drot). Hence, where only four discrete calibration moves are used, a single set of solutions for a three-by-three matrix and a separate one-by-one matrix are carried out. Conversely, where moves K are greater than four, then a three-by-K matrix and a one-by-K matrix are employed.

It should be clear to those of ordinary skill that the use of the search tool provides a significantly higher degree of robustness and versatility to the visual servoing of a robot relative to prior techniques. A single fiducial can be used to properly guide a robot along a plurality of axes, even those generally orthogonal to the camera's image plane. In this manner the movement of a workpiece into a target, to a particular angle relative to the target, and even to a certain elevation to the target is accomplished with relative ease and certainty.

The foregoing has been a detailed description of a preferred embodiment of the invention. Various modifications and additions can be made without departing from the spirit and scope thereof. Also, while a robot having at least four degrees of movement freedom is employed, it is expressly contemplated that the principles described herein are applicable to a robot with greater or fewer than four degrees. The number of cameras used herein is highly variable. The cameras and associated imaging/machine vision software used herein can be adapted to poll multiple cameras simultaneously, use images from different cameras in succession, or continuously poll the cameras to resolve the best image at all times of the workpiece. While the cameras herein are shown positioned generally above the work area, they can also be positioned below the work area, and fiducials can be arranged to be viewed in this orientation. Finally, the system and method of this invention can be carried out in a variety of ways including use of hardware, software or a combination of hardware and software. The procedure herein can, therefore, be characterized as a computer-readable medium having a program instruction set executed by a computer. Accordingly, this description is meant to be taken only by way of example, and not to otherwise limit the scope of the invention. Accordingly, this description is meant to be taken only by way of example, and not to otherwise limit the scope of this invention. Finally, it is expressly contemplated that a search tool adapted to register transformation of a pattern in further degrees of freedom can be employed in conjunction with the teachings of this invention. In particular, commonly owned U.S. patent application Ser. No. 09/737,836, filed on Dec. 15, 2000, entitled SYSTEM AND METHOD FOR REGISTERING PATTERNS TRANSFORMED IN SIX DEGREES OF FREEDOM USING MACHINE VISION by Aaron S. Wallack, expressly incorporated herein by reference, teaches a technique for finding and locating (registering) trained patterns/fiducials with varying values for of aspect and shear with respect to the image plane of the camera.

What is claimed is:

1. A system for guiding a robot, carrying a workpiece, operating in a work area comprising:
    a machine vision system having a camera located so as to acquire an image of the work area, the machine vision system including a machine vision search tool for locating an instance of a trained pattern in the image, the tool registering the trained pattern transformed by at least two translational degrees of freedom and at least one non-translational degree of freedom with respect to an image plane acquired by the machine vision search tool;
    a fiducial, on the workpiece, the fiducial matching the trained pattern;
    wherein the search tool is for determining, based upon the image, a relative location of the workpiece with respect to a predetermined reference point in the machine vision search tool at which the workpiece is employed; and
    means for mapping between the predetermined reference point in the machine vision search tool and a predetermined reference point in a reference system of the robot.

2. The system as set forth in claim 1 wherein the predetermined reference point in the machine vision search tool comprises a desired location of the fiducial that corresponds to a target location for the work piece in the reference system of the robot.

3. The system as set forth in claim 1 wherein the predetermined reference point in the machine vision search tool comprises a desired location of the fiducial, and further comprising software for computing a difference between the viewed location of the fiducial and the desired location of the fiducial.

4. The system as set forth in claim 1 further comprising a robot controller that directs the workpiece so that the fiducial is positioned at the predetermined reference point based upon the means for mapping.

5. The system as set forth in claim 1 further comprising software for computing a difference between the viewed location and the predetermined reference point and wherein the means for mapping transforms the difference into a displacement vector with respect to a movement reference system of the robot controller.

6. The system as set forth in claim 5 wherein the robot controller directs the robot to move the workpiece in four degrees of freedom, including two degrees defining movement axes substantially coincident with the image plane, one degree defining a movement axis substantially perpendicular to the image plane and one degree defining a rotation of the workpiece substantially within the image plane about the axis substantially perpendicular to the image plane.

7. The system as set forth in claim 5 wherein the robot controller is interconnected to the machine vision search tool so as to receive the displacement vector, the robot controller being for moving the robot to, thereby, move the workpiece based upon the displacement vectors.

8. The system as set forth in claim 7 wherein the means for mapping is for providing an under-correction to the displacement vector so that the robot, based upon the robot controller, moves the workpiece less than an amount needed to locate the fiducial at the desired location.

9. The system as set forth in claim 1 wherein the predetermined reference point in the machine vision search tool comprises a desired location for the fiducial, and further comprising software for computing a difference between the viewed location of the fiducial and the desired location of the fiducial in the machine vision search tool, and wherein the difference is resolved into the non-translational degrees of freedom including two orthonagl axes within the image plane.

10. The system as set forth in claim 9 wherein the difference is resolved into the non-translational degree of freedom that comprises one of either a rotation within the image plane or a scale value along an axis substantially perpendicular to the image plane.

11. The system as set forth in claim 1 wherein the search tool comprises a rotation/scale-invariant search (RSIS) tool for determining the relative location of the fiducial in each at least four degrees of freedom including each of the two translational degrees and one rotational degree about an axis transverse to the image plane defined by the two translational degrees and one degree along the axis transverse to the image plane.

12. The system as set forth in claim 1 wherein the fiducial comprises a structure formed on the workpiece.

13. The system as set forth in claim 1 wherein the workpiece comprises one of either a part for positioning at a target location or a tool operating at the target location.

14. A method for guiding a robot, carrying a workpiece, operating in a work area comprising:
    acquiring an image in the work area with a machine vision search tool for locating an instance of a trained pattern in the image, the tool registering the trained pattern transformed by at least two translational degrees of freedom and at least one non-translational degree of freedom with respect to an image plane acquired by the machine vision search tool;
    positioning a workpiece having fiducial matching the trained pattern in an end effector of the robot and with respect to a field of view of the machine vision search tool;
    determining, based upon the image, a relative location of the workpiece with respect to a predetermined reference point in the machine vision search tool at which the workpiece is employed; and
    mapping between the predetermined reference point in the machine vision search tool and a predetermined reference point in a reference system of the robot.

15. The method as set forth in claim 14 wherein the predetermined reference point in the machine vision search tool comprises a desired location of the fiducial that is mapped by the step of mapping to a target location for the workpiece at which the workpiece is employed.

16. The method as set forth in claim 14 wherein the predetermined reference point in the machine vision search tool comprises a desired location of the fiducial and further comprising computing a difference between the viewed location of the fiducial and the desired location.

17. The method as set forth in claim 14 further comprising directing, with a robot controller, the robot to move the workpiece so that the fiducial is positioned at the predetermined reference point.

18. The method as set forth in claim 17 wherein the step of directing robot includes moving the workpiece in four degrees of freedom, including two degrees defining movement axes substantially coincident with the image plane, one degree defining a movement axis substantially perpendicular to the image plane and one degree defining a rotation of the workpiece substantially within the image plane about the axis substantially perpendicular to the image plane.

19. The method as set forth in claim 14 wherein the predetermined reference point in the machine vision search tool comprises a desired location of the fiducial in the machine vision search tool, and further comprising computing a difference between the viewed location of the fiducial and the desired location, directing, with a robot controller, the robot so as to move the workpiece so that the fiducial is positioned at the predetermined reference point in the machine vision search tool and transforming the difference into a displacement vector with respect to a movement reference system of the robot controller.

20. The method as set forth in claim 19 further comprising transmitting, to the robot controller from the machine vision search tool, a displacement vector, and commanding the robot to move the workpiece based upon the displacement vector.

21. The method as set forth in claim 20 wherein the step of transforming includes providing an under-correction to the displacement vectors so that the robot, based upon the robot controller, moves the workpiece less than an amount needed to locate the fiducial at the desired location.

22. The method as set forth in claim 19 further comprising performing an operation at a target area with a workpiece that comprises a tool after the step of directing.

23. The method as set forth in claim 14 wherein the predetermined reference point in the machine vision search tool comprises a desired location of the fiducial and further comprising computing a difference between the viewed location of the fiducial and the desired location of the fiducial, and wherein the step of computing includes resolving the difference into the non-translational degrees of freedom including two orthogonal axes within the image plane.

24. The method as set forth in claim 23 wherein the step of computing includes resolving the difference into the non-translational degree of freedom that comprises one of either a rotation within the image plane or a scale value along an axis substantially perpendicular to the image plane.

25. The method as set forth in claim 14 wherein the step of determining includes deriving the relative location of the fiducial with a rotation/scale-invariant search (RSIS) tool for determining the relative location of the fiducial in each of the four degrees of freedom including each of the two translational degrees and one rotational degree about an axis transverse to the image plane defined by the two translational degrees and one scale degree along the axis transverse to the image plane.

26. The method as set forth in claim 14 further comprising training the search tool to recognize the fiducial including exposing the search tool to an image containing the fiducial and selecting a window that contains the fiducial so as to cause the search tool to store a pattern of the selected window with the fiducial therein.

27. The method as set forth in claim 14 further comprising training the machine vision search tool to recognize the fiducial based upon loading a stored image file including a pattern substantially matching the fiducial therein.

28. The method as set forth in claim 14 further comprising calibrating the search tool to recognize a predetermined displacement of the fiducial including moving the workpiece for a predetermined displacement from a base location in each of a plurality of degrees of freedom and locating the fiducial at a respective displaced location after moving for each predetermined displacement so as to compute a difference between the base location and each respective displaced location.

29. The method as set forth in claim 28 wherein the step of calibrating further comprises mapping the difference with respect to predetermined known displacement values for the workpiece in a robot reference system and providing a displacement vector based upon the mapping to the robot so as to enable adjustment of the robot to a corrected location relative to the predetermined reference point in the machine vision search tool.

30. A computer-readable medium executed on a computer for guiding a robot carrying a workpiece operating in a work area, the computer-readable medium comprising program instructions for performing the steps of:
    acquiring an image in the work area with a machine vision search tool that locates an instance of a trained pattern in the image, the tool registering the trained pattern transformed by at least two translational degrees of freedom and at least one non-translational degree of freedom with respect to an image plane acquired by the machine vision search tool;
    positioning a workpiece having fiducial matching the trained pattern; and
    determining, based upon the image, a relative location of the workpiece with respect to a predetermined reference point in the machine vision search tool at which the workpiece is employed; and
    mapping between the predetermined reference point in the machine vision search tool and a predetermined reference point in a reference system of the robot.

31. The computer-readable medium as set forth in claim 30 wherein the predetermined reference point in the machine vision search tool comprises a desired location of the fiducial and further comprising computing a difference between the viewed location of the fiducial and the desired location of the fiducial, and wherein the step of computing includes resolving the difference into the non-translational degrees of freedom including two orthogonal axes within the image plane.

32. The computer-readable medium as set forth in claim 31 wherein the step of computing includes resolving the difference into the non-translational degree of freedom that comprises one of either a rotation within the image plane or a scale value along an axis substantially perpendicular to the image plane.

33. The computer-readable medium as set forth in claim 30 wherein the step of determining includes deriving the relative location of the fiducial with a rotation/scale-invariant search (RSIS) tool for determining the relative location of the fiducial in each of the four degrees of freedom including each of the two translational degrees and one rotational degree about an axis transverse to the image plane defined by the two translational degrees and one scale degree along the axis transverse to the image plane.

34. The computer-readable medium as set forth in claim 30 further comprising training the search tool to recognize the fiducial including exposing the search tool to an image containing the fiducial and selecting a window that contains the fiducial so as to cause the search tool to store a pattern of the selected window with the fiducial therein.

35. The computer-readable medium as set forth in claim 30 further comprising training the search tool to recognize the fiducial based upon loading a stored image file including a pattern substantially matching the fiducial therein.

36. The computer-readable medium as set forth in claim 30 further comprising calibrating the search tool to recognize a predetermined displacement of the fiducial including moving the workpiece for a predetermined displacement from a base location in each of a plurality of degrees of freedom and locating the fiducial at a respective displaced location after moving for each predetermined displacement so as to compute a difference between the base location and each respective displaced location.

37. The computer-readable medium as set forth in claim 36 wherein the step of calibrating further comprises mapping the difference with respect to predetermined known displacement values for the workpiece in a robot reference system and providing a displacement vector based upon the mapping to the robot so as to enable adjustment of the robot to a corrected location relative to the predetermined reference point in the machine vision search tool.

* * * * *